(12) United States Patent
McKeen et al.

(10) Patent No.: US 9,416,292 B2
(45) Date of Patent: Aug. 16, 2016

(54) FLUOROPOLYMER NON-STICK COATINGS

(71) Applicant: THE CHEMOURS COMPANY FC LLC, Wilmington, DE (US)

(72) Inventors: Laurence Waino McKeen, Sewell, NJ (US); Ying Wang, West Chester, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 5 days.

(21) Appl. No.: 14/508,291

(22) Filed: Oct. 7, 2014

(65) Prior Publication Data

US 2015/0024193 A1    Jan. 22, 2015

Related U.S. Application Data

(62) Division of application No. 13/089,637, filed on Apr. 19, 2011, now Pat. No. 8,889,779.

(60) Provisional application No. 61/347,833, filed on May 25, 2010.

(51) Int. Cl.
| | | |
|---|---|---|
| C08L 27/18 | (2006.01) | |
| C08L 27/12 | (2006.01) | |
| C09D 127/18 | (2006.01) | |
| F16L 58/10 | (2006.01) | |
| C08K 5/053 | (2006.01) | |
| C08K 7/00 | (2006.01) | |
| C08K 13/04 | (2006.01) | |

(52) U.S. Cl.
CPC ............ *C09D 127/18* (2013.01); *F16L 58/1009* (2013.01); *F16L 58/1027* (2013.01); *C08K 5/053* (2013.01); *C08K 7/00* (2013.01); *C08K 13/04* (2013.01); *C08L 27/18* (2013.01); *C08L 2205/02* (2013.01); *Y10T 428/25* (2015.01); *Y10T 428/251* (2015.01); *Y10T 428/31544* (2015.04)

(58) Field of Classification Search
USPC .................................. 524/501, 520; 428/324
See application file for complete search history.

(56) References Cited

U.S. PATENT DOCUMENTS

| | | | |
|---|---|---|---|
| 2,833,686 A | 5/1958 | Sandt | |
| 3,087,827 A | 4/1963 | Klenke et al. | |
| 3,087,828 A | 4/1963 | Linton | |
| 3,087,829 A | 4/1963 | Linton | |
| 3,356,108 A | 12/1967 | Johnston | |
| 4,029,868 A | 6/1977 | Carlson | |
| 5,502,097 A * | 3/1996 | Saito | C08K 7/02 524/356 |
| 5,566,984 A | 10/1996 | Abbema et al. | |
| 5,677,404 A | 10/1997 | Blair | |
| 5,972,494 A * | 10/1999 | Janssens | B05D 5/083 106/14.05 |
| 6,397,895 B1 | 6/2002 | Lively | |
| 6,418,349 B1 | 7/2002 | Hahn et al. | |
| 6,505,649 B1 | 1/2003 | Dixon-Roche | |
| 6,518,329 B1 | 2/2003 | Lin et al. | |
| 6,541,588 B1 | 4/2003 | Kaulbach et al. | |
| 6,841,594 B2 | 1/2005 | Jones et al. | |
| 7,575,789 B2 | 8/2009 | McKeen | |
| 7,588,058 B2 * | 9/2009 | McKeen | B05D 5/083 138/137 |
| 8,383,199 B2 * | 2/2013 | McKeen | F16L 9/121 427/239 |
| 8,889,779 B2 * | 11/2014 | McKeen | C09D 127/18 524/501 |
| 2009/0078328 A1 | 3/2009 | Albert et al. | |

FOREIGN PATENT DOCUMENTS

| | | |
|---|---|---|
| WO | 00/58389 A1 | 10/2000 |
| WO | 2011/150003 A1 | 12/2011 |
| WO | WO-2011/150003 A1 * | 12/2011 |

OTHER PUBLICATIONS

International Search Report, PCT/US2011/037831, Date of Mailing Aug. 5, 2011.

* cited by examiner

*Primary Examiner* — Peter D Mulcahy
*Assistant Examiner* — Henry Hu

(57) ABSTRACT

A coating composition is provided comprising (a) an aqueous medium, (b) melt-fabricable perfluoropolymer dispersed in said aqueous medium and having a melting temperature of at least 290° C., (c) melt-fabricable perfluoropolymer dispersed in said aqueous medium and having a melting temperature of no greater than 270° C., and (d) water miscible organic liquid having a boiling temperature of at least 280° C. and optionally (e) filler, the combination of (c) and (d) providing sloughing resistance to said composition applied to a non-horizontal substrate and baked, component (d) being unnecessary when component (a) is not present in the coating composition, and when filler is present the amount of (c) being present in an effective amount to increase the cohesive strength of the baked layer of the coating composition.

5 Claims, No Drawings

FLUOROPOLYMER NON-STICK COATINGS

CROSS-REFERENCES TO RELATED APPLICATIONS

This application is a DIV of application Ser. No. 13/089,637, filed on Apr. 9, 2011, now U.S. Pat. No. 8,889,779, which claims benefit to U.S. provisional application No. 61/347,833, filed on May 25, 2010.

FIELD OF THE INVENTION

This invention relates to increasing the adhesion between primer and overcoat layer forming a non-stick coating on a substrate and to increasing the cohesive strength of the overcoat layer.

BACKGROUND OF THE INVENTION

U.S. Pat. No. 7,575,789 discloses a lining adhered to the interior surface of an oil well pipe, also known as oil production tube or down-hole oil pipe, the lining including a primer layer and an overcoat layer on the primer layer, the overcoat providing a non-stick perfluoropolymer surface. In a preferred embodiment, the primer layer is formed by spraying a liquid-based primer composition onto the interior surface of the pipe and drying or baking the primer composition to form the primer layer, followed by spraying a liquid composition onto the primer layer and drying and baking this composition to form the overcoat layer. This lining has performed admirably in oil well application, preventing the plugging of the oil well pipe by deposition of asphaltenes, paraffin wax, and inorganic scale present in the oil flowing through the pipe A water-miscible organic liquid with a high boiling temperature, notably glycerin, which boils at 291° C., is included in the overcoat composition of U.S. Pat. No. 7,575,789 in a substantial amount to prevent the dried coating, prior to baking, from sloughing off of the primer layer within the interior of the pipe wherein the cylindrical surface is mostly non-horizontal. U.S. Pat. No. 5,502,097 discloses the use of such high boiling liquid in the coating composition to prevent sloughing off of the coating from a vertical surface. The interior of oil well pipe presents a continuum of surface varying from the non-horizontal, including vertical and overhanging (upper), looking down on the lower surface of the pipe. This sloughing off of the dried coating from non-horizontal surface is a problem, especially if the pipe being lined is moved or impacted during drying, until the baking of the dried layer fuses the perfluoropolymer present in the layer, resulting in the overcoat adhering to the primer layer. While the high boiling organic liquid is effective in resisting sloughing, its boiling temperature is less than that of the baking temperature, whereby the liquid volatilizes, often resulting in excessive smoking (fuming) of the layer. There is a need for solving the sloughing problem without having to volatilize so much organic liquid.

While, the pipe lining of U.S. Pat. No. 7,575,789 performs admirably well in oil well operation, there are occasions in oil recovery or maintenance of the oil well pipe that the interior of the pipe is exposed to pressurization and rapid decompression. U.S. Patent Publication 2009/0078328 discloses an Autoclave Test simulating the effect pressurization and rapid decompression on a pipe having a non-stick lining. The autoclave contains test fluids, liquid and gas, comparable to those encountered in an oil well and a non-stick lining that would be used for oil well pipe. The lining is formed from a primer layer on the metal surface, which could be that of the interior of the pipe, and an inner layer adhered to the primer layer and an outer layer adhered to the inner layer. The combination of the inner layer and outer layer is the overcoat for the primer layer. Pressurization forces test fluids to permeate into the coating, and rapid decompression results in the rapid exit of these penetrated fluids from the coating, causing blistering (layer separation) within the coating, namely between the primer layer and the inner layer of the overcoat. This blistering represents locations for potential corrosive attack and coating failure in actual service, wherein the coating forms the interior surface of oil well pipe. There is a need to increase the adhesion between the primer layer and overcoat of the pipe lining so that the lining has greater resistance to blistering should the occasion of rapid decompression of the pressurized interior of the lined pipe arise in actual down-hole service.

The outer layer of the oil pipe lining of U.S. Pat. No. 7,575,789 may contain particles that form a mechanical barrier against the permeation of water, solvents, and gases. While these particles are effective in protecting the metal surface of the pipe underlying the non-stick coating from corrosion, the coating is nevertheless susceptible to blistering upon rapid decompression. Apparently enough fluid permeates into the lining to give this disadvantageous result. While the presence of the permeation barrier particles, usually platelet in shape, protects the underlying pipe surface from corrosion, the inner layer of the overcoat containing these particles, exhibit decreased cohesive strength. Cohesive strength is the strength of the layer within itself, i.e. the ability if the layer to retain its integrity under stress, in contrast to the strength of the bond between the inner layer and adjacent layers. As a result of this reduced cohesive strength, the lining is subject to delamination from physical abuse that may be encountered in down-hole operation, for example being struck by a down-hole tool inserted into the pipe. This delamination has been found to be a failure within the thickness of the overcoat, i.e. within the inner layer of the lining of U.S. Pat. No. 7,575,789, by separation of the fluoropolymer constituent of the inner layer from the surface of the particles lying within the inner layer. The location of this delamination then becomes a point for corrosive attack on the underlying pipe surface and a loss of non-stick character inviting the buildup and plugging from one or more of asphaltenes, wax and inorganic scale. There is a need to increase the cohesive strength of the layer containing the barrier particles.

SUMMARY OF THE INVENTION

The present invention in its various embodiments provides a non-stick coating or lining that satisfies all these needs.

Embodiment A of the present invention is directed at reducing the emission of volatiles from the coating during baking of the coating, without loss of sloughing resistance from non-horizontal surfaces on which the coating is applied. This embodiment can be defined as a coating composition that resists sloughing from a non-horizontal metal substrate prior to baking, with the components comprising (a) an aqueous medium, (b) melt-fabricable perfluoropolymer dispersed in said aqueous medium and having a melting temperature of at least 290° C., and a sloughing-resistant amount of the combination of (c) melt-fabricable perfluoropolymer dispersed in said aqueous medium and having a melting temperature of no greater than 270° C. and (d) water miscible organic liquid having a boiling temperature of at least 280° C.

Another aspect of this embodiment is the composition of the baked layer of this composition on the metal substrate. Baking drives off all lower boiling materials present in the as-applied composition. Thus, components (a) and (d) would no longer be present in the baked layer. Another component that would not be present in any significant amount is heat resistant polymer binder that is used in primer layer compositions to adhere the primer layer to a metal substrate. This would not be present in the baked layer because the composition of embodiment A is essentially free of such polymer binder, the baked layer formed from embodiment A therefore requiring a primer layer to be first applied to the metal substrate, on which the composition of embodiment A is then applied. The baking to form the overcoat layer of this composition thus comprises fusing said melt-fabricable perfluoropolymers of (b) and (c).

The result of the baking of the overcoat layer and thus the primer layer if not already baked is the aspect of embodiment A wherein the metal substrate has a non-stick lining comprising a primer layer on the metal substrate and an overcoat layer on the primer layer, the overcoat layer comprising melt-fabricable perfluoropolymer (b) having a melting temperature of at least 290° C. and melt-fabricable perfluoropolymer (c) having a melting temperature of no greater than 270° C. This aspect of embodiment A produces the surprising result of increasing rapid decompression adhesion between the primer layer and the overcoat layer. The amount of melt-fabricable perfluoropolymer having a melting temperature of no greater than 270° C. present in the baked layer is that which is effective to produce this improvement, whereby this aspect of embodiment A produces a baked layer that has improved resistance to blistering when the lining is subjected to rapid decompression.

Embodiment B is directed to increasing the cohesive strength of the layer obtained from the composition, either as applied and eventually baked, of embodiment A, when such composition contains permeation barrier particles. This embodiment can be defined as a coating composition that provides an overcoat layer for a non-stick coating on a metal substrate, comprising (b) melt-fabricable perfluoropolymer having a melting temperature of at least 290° C., (c) melt-fabricable perfluoropolymer having a melting temperature of no greater than 270° C., and (e) filler, the presence of filler in said overcoat layer weakening the cohesive strength of said overcoat layer when (c) is not present, the amount of (c) being present being an effective amount to increase the cohesive strength of said overcoat layer. The filler is the barrier particles. In this embodiment, the perfluoropolymers (b) and (c) are the same as the perfluoropolymers (b) and (c) of embodiment A. The overcoat layer made from the composition of embodiment B also requires a primer layer on the metal substrate in order for the overcoat to form an adherent non-stick coating Common to both embodiments A and B is the beneficial effect of adding melt-fabricable perfluoropolymer having a melting temperature of no greater than 270° C. to the composition to be applied to the primer layer-coated metal substrate, whereby this polymer is also present in the baked layer formed from this composition. In embodiment A, this lower melting perfluoropolymer replaces most of the water immiscible high boiling organic liquid as the anti-sloughing additive to the composition, thereby reducing organic volatiles in the baking step, and provides the further beneficial effect of improved resistance to blistering as described above. While the water miscible organic liquid having a boiling temperature of at least 280° C. is a required component in the as-applied composition in embodiment A, it is not required when the metal substrate has the shape that avoids the sloughing problem. In that event, the baked layer having improved resistance to blistering under rapid decompression is obtained without using the high boiling organic liquid. The same is true for the as-applied composition of embodiment B, which can be applied as a powder coating, thereby not requiring the as-applied composition to be in the form of a liquid medium, or if in the form of a liquid medium, the liquid can be organic or aqueous. Filler is present in the composition of embodiment B, whereby the presence of melt-fabricable perfluoropolymer (c) having a melting temperature of no greater than 270° C. provides the improved cohesive strength to the overcoat layer.

Thus, the present invention can be described as the use of perfluoropolymer (c) to reduce sloughing in the context of embodiment A, or to reduce or eliminate blistering (rapid decompression adhesion) also in the context of embodiment A, even when liquid (d) is not present. The present invention can also be described as the use of perfluoropolymer (c) to increase cohesive strength in the context of embodiment B. These improvements arising from the use of perfluoropolymer (c) can be separately sought and obtained or collectively sought and obtained in the compositions of the present invention. These uses of perfluoropolymer (c) also apply to the many embodiments of metal substrates described hereinafter, such as metal pipes, preferably oil well pipe and heat exchanger pipe, especially forming the interior surface thereof. These uses on metal substrates also apply to the application of the compositions of embodiments A and B.

A preferred embodiment of the present invention when the non-stick coating on a metal substrate forms the interior surface of a metal pipe (tube), is the as-applied composition that is the combination of embodiments A and B i.e. that contains both the filler (e) and the water miscible organic liquid (d) having a boiling temperature of at least 280° C.

The amounts of each component of each composition of the present invention will depend on the application intended and improvement desired as will be discussed hereinafter.

DETAILED DESCRIPTION OF THE PREFERRED EMBODIMENTS

The components used in the compositions of the present invention will first be described, followed by description of the use of these components in the compositions of the embodiments of the present invention.

Both the perfluoropolymer (b) having a melting temperature of at least 290° C., and the perfluoropolymer (c) having a melting temperature of no greater than 270° C. are melt fabricable. By melt fabricable is meant that the fluoropolymer is sufficiently flowable in the molten state that it can be fabricated by melt processing such as extrusion, to produce products having sufficient strength so as to be useful. This melt flowability enables the compositions to be fused in the baking step to form tough pin-hole free layers. The sufficient strength characteristic of melt fabricability can be characterized by the fluoropolymer by itself exhibiting an MIT Flex Life of at least 1000 cycles, preferably at least 2000 cycles using 8 mil (0.21 mm) thick compression molded film. In the MIT Flex Life test, the film is gripped between jaws and is flexed back and forth over a 135° range in accordance with ASTM D 2176.

With respect to the perfluoropolymer (b) having a melt temperature of at least 290° C., examples of this melt-fabricable perfluoropolymer are the copolymer of tetrafluoroethylene (TFE) and perfluoro(alkyl vinyl ether) (PAVE) in which the linear or branched alkyl group contains 1 to 5 carbon atoms. These perfluoropolymers are partially crystalline fluoroplastics and are not perfluoroelastomers and are commonly known as PFA. By partially crystalline is meant that the polymers have some crystallinity and are characterized by a detectable melting point measured according to ASTM D 3418, and a melting endotherm of at least about 3 J/g.

Preferred PAVE monomers are those in which the alkyl group contains 1, 2, 3 or 4 carbon atoms, respectively known as perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer, but included as PFA herein. The selection of the PAVE monomer(s) for copolymerization with TFE and their amount is such that the melting temperature of the resulting perfluoropolymer is at least 290° C., preferably at least 300° C., but typically no greater than 310° C. for best melt flowability to pin-hole free layers. The PAVE monomer PPVE lowers the melting temperature of the PFA less than when the PAVE monomer s PEVE, whereby PPVE is the preferred monomer for copolymerization with TFE to form high melting PFA. PFA has a high thermal stability, and the higher its melting temperature, the greater is its integrity in use as linings at high temperature. To obtain the high melting PFA, generally the PAVE content will be no greater than 10 wt %, no greater than 7 wt % to achieve a melt temperature of at least 300° C., and its minimum content will be at least 1.5 wt % to provide the melt flowability needed for melt fabricability, the remainder to total 100 wt % being TFE. The melt flow rate (MFR) of the PFA is preferably at least 0.1 g/10 min, preferably at least 5 g/10 min, as measured according to ASTM D-1238 and ASTM D 3307-93, at 372° C. using a 5 kg weight on the molten PFA.

The melt-fabricable perfluoropolymer (b) having a melting temperature of at least 290° C. is not polytetrafluoroethylene (PTFE) or PTFE micropowder. Neither of these polymers are melt fabricable. PTFE is not melt fabricable because it does not flow in the molten state. This non-melt flowability arises from the extremely high molecular weight of the PTFE, i.e. at least 1,000,000, and the accompanying high melt viscosity. The non-melt flowability of the PTFE can also be characterized by high melt creep viscosity, sometimes called specific melt viscosity, which involves the measurement of the rate of elongation of a molten sliver of PTFE under a known tensile stress for 30 min, as further described in and determined in accordance with U.S. Pat. No. 6,841,594, referring to the specific melt viscosity measurement procedure of U.S. Pat. No. 3,819,594. In this test, the molten sliver made in accordance with the test procedure is maintained under load for 30 min, before the measurement of melt creep viscosity is begun, and this measurement is then made during the next 30 min of applied load. The PTFE preferably has a melt creep viscosity of at least about $1 \times 10^6$ Pa·s, more preferably at least about $1 \times 10^7$ Pa·s, and most preferably at least about $1 \times 10^8$ Pa·s, all at 380° C. The fact that the creep of the sliver can be measured under this condition, means that the sliver remained intact during the creep test, instead of elongating to rupture if the sliver (PTFE) were melt flowable. PTFE micropowder is melt flowable, because it is low molecular weight PTFE, but it is not melt fabricable. This melt flowable PTFE, which has an MFR that is measurable by ASTM D 1238-94a, is obtained by direct polymerization under conditions that prevent very long polymer chains from forming, or by irradiation degradation of non-melt flowable PTFE. PTFE micropowder is not melt fabricable because the article molded from the melt is useless, by virtue of extreme brittleness. Because of its low molecular weight (relative to non-melt-flowable PTFE), it has no strength. An extruded filament of the PTFE micropowder is so brittle that it breaks upon flexing. Compression molded film for the MIT flex life test generally cannot be made from PTFE micropowder, i.e. the film tends to crack in the mold. Any intact portions of the film crack when flexed.

With respect to the perfluoropolymer (c) component, this fluoropolymer is preferably a copolymer of tetrafluoroethylene (TFE) and hexafluoropropylene (HFP), typically referred to as FEP. In these copolymers, the HFP content is typically about 6-17 wt %, preferably 9-17 wt % (calculated from HFPI×3.2). HFPI is the ratio of infrared radiation (IR) absorbances at specified IR wavelengths as disclosed in U.S. Statutory Invention Registration H130. Preferably, the TFE/HFP copolymer includes a small amount of additional comonomer to improve properties. The preferred TFE/HFP copolymer is TFE/HFP/perfluoro(alkyl vinyl ether) (PAVE), wherein the alkyl group contains 1 to 4 carbon atoms. Preferred PAVE monomers are perfluoro(ethyl vinyl ether) (PEVE) and perfluoro(propyl vinyl ether) (PPVE). Preferred TFE/HFP copolymers containing the additional comonomer have an HFP content of about 6-17 wt %, preferably 9-17 wt % and PAVE content, preferably PEVE, of about 0.2 to 3 wt %, with the remainder of the copolymer being TFE to total 100 wt % of the copolymer. Examples of FEP compositions are those disclosed in U.S. Pat. No. 4,029,868 (Carlson), U.S. Pat. No. 5,677,404 (Blair), and U.S. Pat. No. 6,541,588 (Kaulbach et al.) and in U.S. Statutory Invention Registration H130. The FEP is partially crystalline as defined above, that is, it is not a fluoroelastomer.

The composition of the FEP described above is chosen so the its melt temperature of no greater than 270° C., preferably no greater than 265° C. so that this copolymer commences melting before the high boiling organic liquid is completely volatilized from the layer being baked. This melting holds the layer in place, not allowing it to slough off of the primer layer before baking is complete. It is also preferred that the FEP have a melting temperature of at least 250° C., more preferably at least 255° C., to provide the highest thermal stability for the copolymer. Thus, the melting temperature range for this lower melting perfluoropolymer component can be 250-270° C., 255-270° C., 250-265° C. or 255-265° C., and any of these lower melting perfluoropolymers can be used in the composition along with the perfluoropolymer having a melting temperature of at least 290° C. or at least 300° C.

The perfluoropolymers (b) and (c) present in the composition is preferably in the form of a powder, which is an agglomeration of submicrometer-size dispersion-polymerized particles formed in an aqueous medium (a). The powder is preferably obtained by spray drying the aqueous medium containing the dispersion polymerized perfluoropolymer particles as disclosed in U.S. Pat. No. 6,418,349. As disclosed in this patent, the powder formed by the spray drying comprises friable granules of agglomerated primary particles (as polymerized). The friable nature of the granules gives them a high bulk density, e.g. at least 20 g/100 cc and a lower specific surface area (SSA), 1-6 g/m$^2$, than the 10-12 m$^2$/g for the as-polymerized dispersed primary particles of the perfluoropolymer. SSA is measured as described in this patent. At the time of the patenting of the invention of U.S. Pat. No. 6,518, 329, the average particle size of the powder produced by the spray drying was 5 to 100 micrometers, which could be reduced by densifying and comminution as disclosed in the patent. The perfluoropolymer powder used in the present invention can be as spray dried or densified, with the preferred average particle size being 2 to 100 micrometers, more preferably, 2 to 60 micrometers.

While the perfluoropolymers (b) and (c) are preferably in the form of powders as described above, they can also be in the form of as-polymerized submicrometer-size primary particles. The powder form, however, provides the advantage of promoting the high viscosity desired for the liquid form of the coating composition for achieving thick overcoat layer thicknesses, i.e. at least 30 micrometers thick.

With respect to the water miscible high boiling organic liquid (d) having a boiling temperature of at least 280° C., examples of such liquids include glycerin and polyethylene glycol and mixtures thereof. These liquids impart sloughing resistance to the layer being formed on non-horizontal surfaces by drying the composition and before the baking temperature is reached. When the baking temperature reaches the boiling temperature of the organic liquid, the liquid volatilizes without leaving any measurable residue in the layer. The baking temperature for the lining will generally be between 360-410° C., depending on layer thickness and time of baking desired, without decomposing any of the perfluoropolymers present in the lining. The baking step is well above the melting temperatures of the perfluoropolymers in the composition, whereby they flow and fuse together to form a pin-hole free layer. The boiling temperature of the organic liquid will be at least 10° C. less than the baking temperature for the layer and thus the lining, generally no greater than 340° C. The volatilization of the high boiling organic liquid is accompanied by the emission of smoke from the coating (lining) during baking. The present invention provides for greatly reduced smoke emission, by enabling the amount of high boiling organic liquid to be reduced without loss of sloughing resistance by virtue of the presence of the fluoropolymer (c) in the composition forming the baked layer.

With respect to the filler component (e), these are particles that are preferably platelet in shape to provide the most effective mechanical barrier to permeation of gases and liquids through the thickness of the layer containing this filler, thereby protecting the metal substrate from corrosion. Examples of platelet-shaped filler include glass flakes and mica, including mica particles coated with an oxide layer like iron or titanium oxide. The platelet particles will be small in size so as to be containable within the thickness of the layer containing these particles. Thus, these particles will generally have an average particle size (diameter) of about 10 to 200 microns, preferably 20-100 microns, with no more than 50% of the particles of flake having average particle size of more than about 300 microns. The thickness of the platelets will be less than the diameter, usually at least ⅕ the diameter, and most often no greater than 5 micrometers in thickness. Mica particles which coated with oxide layer that can be used in the present invention include those described in U.S. Pat. No. 3,087,827 (Klenke and Stratton); U.S. Pat. No. 3,087,828 (Linton); and U.S. Pat. No. 3,087,829 (Linton). The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

Examples of other components that can be present in compositions of the present invention, include thickeners such as acrylic polymer, low boiling organic solvents, e.g. those disclosed in U.S. Pat. No. 7,575,789 having a boiling temperature of 50 to 200° C., and dispersing agents. All of these other components are fugitive in the sense they are volatilized away from the layer during the baking step.

The aqueous medium is primarily or entirely water depending on whether the composition is embodiment A or embodiment B, and includes the solution of other soluble components in the water. In the calculation of composition wt % s, however, aqueous medium (a) is considered to be entirely of water.

The coating compositions of embodiments A and B will not contain any significant amount of non-fluorinated heat resistant (thermally stable) polymer binder. As disclosed in U.S. Pat. No. 7,575,789, this polymer binder is present in the primer layer to adhere it to the metal substrate. The compositions of the present invention do not contain enough of such polymer binder to serve as a primer layer, whereby layers formed from these compositions require that a primer layer be formed on the metal substrate for adhering said coating composition to said surface. Examples of primer layers are those disclosed in U.S. Pat. No. 7,575,789. Thus, the baked layer(s) from the coating compositions of the present invention that are formed on the primer layer will be essentially free of heat-resistant polymer binder. A small amount of polymer binder can be present in the coating composition to modify an adhesion property between overcoat and primer layer, but preferably no heat-resistant polymer binder is present in either the coating compositions of the present invention or in the baked layers obtained therefrom. If a small amount of heat-resistant polymer binder is present, such amount will preferably be no greater than 20% of the total weight of perfluoropolymers (b) and (c) in the composition for both embodiments A and B, more preferably no greater than 10 wt %, most preferably no greater than 5 wt %.

The preferred primer contains both perfluoropolymer along with an effective amount of heat-resistant polymer binder to adhere the layer formed from the primer to the metal substrate. The preferred perfluoropolymer in the primer layer is perfluoropolymer (c), most preferably, FEP. In this regard, the perfluoropolymer or FEP content of the primer is preferably at least 80% of the entire perfluoropolymer content of the primer, more preferably at least 90 wt %, and most preferably, 100%.

With respect to embodiment A, the compositions in this embodiment can use any of the melt-fabricable perfluoropolymers having a melting temperature of at least 290° C. described above as component (b) and any of the melt-fabricable perfluoropolymers having a melting temperature of no greater than 270° C. described above as component (c) dispersed in aqueous medium (a). The coating composition preferably contains about 2-15 wt % of the combination of (c) and (d) with respect to the sum of components (a), (b), (c) and (d), and preferably the amount of (c) plus (d) is at least 3 wt % and does not exceed 10 wt %. The amount of (d) is preferably 0.5 to 3 wt %, and the amount of (c) is preferably 1 to 8 wt %, more preferably 1 to 4 wt %, all based on the sum of (a), (b), (c), and (d). U.S. Pat. No. 7,575,789 discloses the presence of 8.3 wt % glycerin in the coating composition (Table 4). It has been found that equivalent sloughing resistance can be obtained with the combination of no more than 2 wt % component (d) together with no more than 3 wt % component (c), based on the sum of components (a), (b), (c) and (d). The amount of component (b) present in the compositions is preferably 35 to 55 wt %, based on the sum of (a), (b), (c) and (d) components, and the amount of (c) present in the compositions is preferably at least 1 wt % and no more than 15 wt %, preferably no more than 10 wt %, of the sum of (b) and (c). The baked layer composition will preferably comprise the perfluoropolymers of (b) and (c), with the preferred amount of (c) being no more than 15 wt % of the amount of (b) and constituting 2 to 10 wt % of (b). Preferably, the baked layer contains 2 to 8 wt % of (c) based on the sum of (b) and (c). Perfluoropolymer (b) constitutes the remainder of the (b)+(c) components to total 100 wt %. The sum of components on which wt % s are based total 100 wt %.

The overcoat layer from the coating composition of embodiment A preferably consists of an inner layer and an outer layer, with the inner layer forming the interface between the primer layer and the overcoat, and the outer layer providing the surface of the non-stick lining that is exposed to the environment, e.g. when the metal substrate is a pipe and the surface of the outer layer forms the interior of the pipe exposed to the fluids passing through the pipe. The compositions described in the preceding paragraph apply to the composition of the inner layer. Preferably, these compositions also apply to the outer layer.

The inner layer formed from the coating composition of embodiment A also preferably contains filler (e), preferably having the platelet shape and identities described for increasing the impermeability of said coating composition, i.e. the baked layer formed from the coating composition. These fillers are mentioned as component (e) above with respect to embodiment B, and for simplicity, component (e) will also be used in describing the use of filler in embodiment A. Preferably, the amount of filler (e) used in the compositions of embodiment A will be from 2-10 wt % of the sum of (a), (b), (c), (d) and (e) in the coating composition, more preferably 3 to 6 wt %. In the baked layer obtained from the composition, the amount of filler will preferably be from 4 to 20 wt %, preferably 5 to 15 wt %, based on the sum of (b), (c) and (e). The proportions of (b) and (c) in this baked layer will be the same as in the baked layer of the composition that is free of filler (e). The outer layer formed from the coating composition is preferably free of filler. Example 2 herein discloses the embodiment wherein the overcoat layer is entirely an inner layer composition, and no outer layer is present.

The coating composition is especially useful in providing an overcoat of a non-stick lining of a metal substrate that is a metal pipe, especially down-hole oil pipe, sometimes called oil well pipe or oil production tube. The lining forms the interior surface of the pipe. Dimensions of down-hole oil well pipe and preparation of the interior surface of the pipe for coating are disclosed in U.S. Pat. No. 7,575,789. Generally the oil pipe has an interior diameter of at least two inches (5.1 cm). Another application of the non-stick linings made using compositions of the present invention is the smaller diameter metal pipe used in heat exchangers through which hot water/oil recovered from the earth, especially from extracting oil from tar sand deposits by steam injection, is passed to recover heat expended to recover the oil. This recovered heat is then useful, saving the generation of such heat. Such heat exchanger pipe, often referred to as heat exchanger tube(s), generally has an interior diameter of no greater than one inch (2.54 cm) and as little as no greater than one-half inch (1.3 cm). As heat is removed from the hot water/oil, these small diameter pipes are especially prone to pluggage from solids (wax, asphaltenes, and inorganic scale, coming out of solution in the oil. It has been found that compositions of the present invention providing the overcoat for the non-stick coating (lining) forming the interior surface of the heat exchanger pipe (tube(s)), greatly reduces or prevents this pluggage. The coating operation is also free of the intense smoking that arises from baking of the overcoat layer composition when it contains the large amount of component (d) needed to by itself provide the sloughing resistance needed prior to the perfluoropolymer (b) being melted enough to retain the coating composition in place to form the baked overcoat layer within the pipe.

Methods useful for coating the interior of a pipe with composition of the present invention are disclosed in U.S. Pat. No. 7,575,789 and U.S. Patent Publication 2009/0078328. In the present invention, the non-stick lining will preferably have a total thickness of at least 75 micrometers, more preferably at least 100 micrometers, of which the primer layer will be 8 to 25 micrometers in thickness and the overcoat will constitute the remaining thickness. Of this remaining thickness, the overcoat inner and outer layers each constitute about 30 to 70% of the total thickness of the overcoat, to total 100% of the thickness of the overcoat. Exemplary of inner layer and outer layer thicknesses are the following: 30 to 60 micrometers thick for each layer. Generally, the non-stick lining will be no thicker than 200 micrometers and the overcoat will be no thicker than 175 micrometers.

With respect to the coating composition of embodiment B aimed at improving cohesive strength the compositions in this embodiment can use as component (b) any of the melt-fabricable perfluoropolymers having a melting temperature of at least 290° C. described above and as component (c) any of the melt-fabricable perfluoropolymers having a melting temperature of no greater than 270° C. described above. In this embodiment, the key components are perfluoropolymers (b), (c), and filler (e). Any of the fillers described above can be used as filler (e) in this embodiment. Embodiment B is similar to embodiment A in that a primer layer is required for adhering the layer formed from the coating composition of embodiment A, there being no significant amount of heat-resistant polymer binder present in the coating composition. Other components as described with respect to embodiment A can also be present in the coating composition of embodiment B. The overcoat formed from the baked layer of this coating composition is preferably the inner layer of the inner layer/outer layer combination forming the overcoat as described above with respect to embodiment A. In another aspect of embodiment B, the inner layer forms the entire overcoat, i.e. there is no filler free outer layer as disclosed in Example 2.

With respect to amounts of components in the coating composition of embodiment B of the present invention, perfluoropolymer (b) constitutes at least 70 wt %, more preferably at least 60 wt %, and most preferably at least 50 wt %, with the perfluoropolymer (c) content being complementary to this wt % to total 100 wt % for the sum of the components (b) and (c). Perfluoropolymer (c) is preferably present in the amount of at least 1 wt %, both based on the sum of components (b) and (c). Preferably, the amount of perfluoropolymer (c) is 2 to 50 wt %, more preferably to further improve cohesive strength, 10 to 50 wt %, and most preferably 20 to 50 wt % of the sum of (b) and (c). The amount of filler will preferably be from 4 to 20 wt %, preferably 5 to 15 wt %, based on the sum of (b), (c) and (e). These compositions for embodiment B would be compositions of the baked layer and the dry powder described below. In the absence of any liquid medium from the coating composition, the composition can be applied as a dry powder, wherein the perfluoropolymers (b) and (c) are powders as described above, having an average particle size of 2 to 100 micrometers, and the filler has the particle size described above. The dry powder can be applied by electrostatic sprayer as well known in the art.

The coating composition can be applied to any primed metal substrate, and an outer layer can be applied having the (b) and (c) compositions described in the preceding paragraph but having no filler (e) present, to complete the overcoat on the primer layer-coated metal substrate. Additional examples of substrates are the exterior of small diameter pipes, sheets for constructing equipment for which an inert, non-stick surface is needed, and the interior of such equipment as tanks and ducts that can be used in the chemical processing industry.

The coating composition of embodiment B can also be in the form of a liquid medium, wherein the liquid is organic or aqueous such as in the case of the coating composition of embodiment A. The liquid content of this composition can be varied as desired, but generally the solids content made up of perfluoropolymers (b) and (c) and filler (e) will constitute 20 to 60 wt % of the sum of these components plus the liquid. The proportions of (b), (c) and (e) can be the same as solids in the liquid medium as for the powder coating composition described above. The particle size of the perfluoropolymers (b) and (c) are preferably the same as described for the coating composition of embodiment A. Examples of organic liquids include those solvents that have a boiling temperature of 50 to 200° C. as discussed above, including such solvents as butyrolactone, NMP, alcohols, methyl ethyl ketone, methyl isobutyl ketone, hydrocarbons such as heavy naphtha, and xylene, furfuryl alcohol, triethanol amine, and mixtures thereof. The liquid-based compositions of embodiment B can have the same utilities as the aqueous based compositions of embodiment A.

Whether the coating composition is in the powder state or liquid medium state, the result after baking as described above with respect to embodiment A will be a non-stick lining on a metal substrate wherein the filler-containing layer and thus the lining has greater cohesive strength than if perfluoropolymer (c) were not present. The baking will typically be carried out at a temperature of at least 375° C.

When the coating composition of embodiment B is part of an aqueous medium and the resultant composition is used to coat a metal substrate having a primer layer thereon, wherein the substrate is non-horizontal, such that the composition tends to slough off before the perfluoropolymer (b) melts during the baking step, it is preferred that the composition also contain water miscible organic liquid having a boiling temperature of at least 280° C. This liquid a can be any of those described above as component (d). The coating composition preferably contains about 2-15 wt % of the combination of (c) and (d) with respect to the sum of components (a), (b), (c) and (d), and preferably the amount of (c) plus (d) is at least 3 wt % and does not exceed 7 wt %. The amount of (d) is preferably 0.5 to 3 wt %, and the amount of (c) is preferably 1 to 4 wt % based on the sum of the components (a), (b), (c), and (d). These wt % s also apply when filler (e) is present in the composition. Greater amounts of perfluoropolymer (c) can be present to further improve cohesive strength of the overcoat layer made from the composition. For example, the amount of (c) can be up to 50 wt %, more preferably up to 60 wt % and most preferably up to 70 wt % based on the sum of components (b) and (c). While the minimum amount of perfluoropolymer (c) can be at least 1 wt %, preferably at least 2 wt %, greater amounts such as at least 10 wt %, preferably at least 15 wt %, and more preferably at least 20 wt % provide such further improvement based on the sum of components (b) and (c). All of these minimum amounts of perfluoropolymer (c) can be used in combination with any of the maximum amounts of perfluoropolymer (c) to form a range of perfluoropolymer (c) compositions togerr with the amount of perfluoropolymer (b) to total 100 wt % of the sum of these components.

The aqueous medium (a) of the compositions of embodiment A and of B (when water is present) is preferably 30 to 55 wt %, based on the sum of the components (b), (c), and (e) when present.

In this embodiment B, the layer thicknesses are preferably as follows: The non-stick lining will preferably have a total thickness of at least 75 micrometers, more preferably at least 100 micrometers, of which the primer layer will be 8 to 25 micrometers in thickness and the overcoat will constitute the remaining thickness. Of this remaining thickness, the overcoat inner layer containing the filler (e) and the overcoat outer layer each constitutes about 30 to 70% of the total thickness of the overcoat, to total 100% of the thickness of the overcoat. Exemplary of inner layer and outer layer thicknesses are the following: 30 to 60 micrometers thick for each layer. Generally, the non-stick lining will be no thicker than 200 micrometers and the overcoat will be no thicker than 175 micrometers.

TEST METHODS

The procedure for determining melting temperature of the perfluoropolymers disclosed herein is by DSC (differential scanning calorimeter) analysis in accordance with ASTM D3418-08. The melting temperatures disclosed herein are the peak melting temperature.

The dried coating layer (film) thickness (DFT) for primer/overcoat is measured using magnetic instruments as described in ASTM D1186.

The particle size for the perfluoropolymer powder disclosed herein is the number average particle size as determined by the laser diffraction method in accordance with ISO 13320-1:1999 using the Microtac® 101 Laser Particle Counter, available from Leeds & Northrup, a division of the Honeywell Corporation.

Adhesion Tests (Autoclave Test and Parallel Scribe Adhesion Test)

Test panels of carbon steel 1.5"×6" (3.8 cm×15.2 cm) are cleaned with an acetone rinse, followed by baking for 30 min @ 800° F. (427° C.) and grit blasting with 40 grit aluminum oxide) to a roughness of approximately 70-125 microinches Ra. The coatings on the test panels are liquid coatings and are applied by using a spray gun, Model Number MSA-510 available from DeVilbiss located in Glendale Heights, Ill. The panels have a grit blasted surface and are coated according to the description in each of the Examples. The panels are subjected to the Autoclave Test described below for determining adhesion quality in two ways, the difficulty in removing the coating from the test panel after being exposed to the Tests and the degree of blistering within the coating arising from exposure to the Tests.

(1) Autoclave Test

Adhesion of the non-stick coating of this invention to the interior surface of a pipe is tested using the Autoclave Test on non-stick coated test panels described above. The non-stick coatings are described in the Examples below and include a primer layer for adhering the overcoat to the test panel, and an overcoat outer layer that is free of filler. The presence of this outer layer increases the danger of blistering in the Autoclve Test because of the greater layer thickness through which absorbed gas or aqueous medium must travel to escape from the coating during rapid decompression. The Autoclave Test is conducted using a modification of NACE TM0185-06 "Evaluation of Internal Plastic Coatings for Corrosion Control of Tubular Goods by Autoclave Testing." Samples of non-stick coated test panels are prepared and suspended in a beaker where test fluids are added and then the beaker is placed into an autoclave unit. The unit is secured and gases are metered into the unit using partial pressures. The heat is turned on and the pressure is monitored until full temperature is reached. The panels are in this way suspended in an autoclave containing two phases: 1) an aqueous phase solution of synthetic formation water (formation water is water produced together with oil from the oil-bearing strata in oil wells; the ionic composition of the formation water is described below), and 2) a gas phase overlying the liquid phase, according to the following test conditions and composition of the two phases:

Temperature: 163° C./325° F.
Pressure: 58.6 MPa/8500 psi

Aqueous: Formation water (Na: 65,000 mg/L; Ca: 23,000 mg/L; Cl: 150,000 mg/L; $SO_4$: 100 mg/L, $HCO_3$: 300 mg/L)

Gas: 16%, $H_2S$, 5% CO2, 79% $CH_4$

Duration: 24 Hours

Decompression Rate: as described in each example

A simplified alternative aqueous phase/gas phase for use in within the autoclave according to the above conditions is as follows:

Aqueous: deionized water containing 5 wt % NaCl

Gas: 1 wt % $H_2S$/99 wt % N

These alternative aqueous/gas phases used in the autoclave gives equivalent results with respect to the results obtained in the Autoclave Test using the aqueous/gas phases first mentioned above. The alternative aqueous/gas phases are used in the to obtain the Autoclave Test results reported in the Examples. This Autoclave Test is more severe than the autoclave permeation testing disclosed in U.S. Pat. No. 7,575,789, wherein the test temperature is 122° C. (251° F.).

During pressurization and soaking under pressure, vapors from the gas and liquid media permeate into the non-stick coating and become the Test Vapor that exits the coating upon the depressurization next described. After twenty four (24) hours, the autoclave is cooled to 93° C. (200° F.). It is then depressurized at a controlled rate as described in each of the examples. This short time frame is used to simulate different rapid decompression rates that might be experienced in actual field service in downhole pipe. After depressurization the coated test panel is removed and examined within one hour for blistering change and adhesion in accordance with NACE TM0185-06.

Blister size is rated by comparison with photographic standards in FIGS. 1-4 (in the standard) according to ASTM D 714-02 using the scale:

Blister size from 10 to 0 (10 being no blisters). Blister size #8 represents blisters whose diameters are so small that they are barely visible with the unaided eye. Blister sizes #6, #4, and #2 represent increasingly larger blister sizes. Blister size #2, e.g. has blisters measuring 4 to 5 mm in diameter. Blister sizes #1 and #0 have increasingly larger blister sizes. These details on blister sizes are given to enable the visualization of these sizes without resorting to the photographic standards, but are not intended as a substitute for reliance on the photographic standards for the actual rating of blister size.

Blister frequency is D (dense), Medium Dense (MD), Medium (M) and Few (F). A blister frequency of None means that no blisters (Blister size of #10) are visible when viewed with the unaided eye (2) Parallel Scribe Adhesion Test Adhesion is evaluated by the Parallel Scribe Adhesion Test wherein the coating is scored to the metal in two parallel scribes approximately ⅛" (5 mm) apart. This scribing is done on the metal panels after being subjected to the Autoclave Test conditions. A knife blade in then inserted into one of the scribes in an attempt to lift the coating from the metal surface of the panel. The adhesion of each layer in the coating system is rated as follows:

A (8-10) The coating does not release from the layer below it. In the case of primer, it does not release from the metal substrate. The only bare metal visible is in the scribes.

B (6-7) Less than 50% of the coating layer below (or in the case of primer, the metal substrate) is visible between the scribes.

C (4-5) More than 50% of the coating layer below (or in the case of primer, the metal substrate 1) is visible between the scribes.

D (2-3) All coating releases from the layer below it between the scribes (or in the case of primer, the metal substrate) when probed with a blade, but remains adhered adjacent to the cuts made by the parallel scribes.

E (0-1) No bond exists between coating and the layer below it (or in the case of primer, the metal substrate metal). Once the film has been scribed, the coating releases.

Post Boiling Water Fingernail Adhesion (PWA) Test—

Coated test panels are submerged in boiling water for 60 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the shape of an X in the film, to test the degree of adhesion of the film. If the coating can be pulled away from the substrate for 1 cm or more, the coating is considered to fail the PWA Test. If the coating cannot be pulled loose for a distance of 1 cm, the coating is considered to pass the PWA Test.

Cross-Hatch Adhesion Test—

Coated test panels are subjected to a cross-hatch (x-hatch) test for adhesion. The coated test panel is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares in the coating. The coated and scribed sample is immersed in boiling water for 60 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing this Test requires that no squares be removed from the 100-square grid.

Taber Shear-Scratch Test—

Before mounting a coated test panel on the Taber® Shear/Scratch Tester, the height of the scale beam is adjusted to match the thickness of the coated test panel. A precision cutting tool, which is attached to a balanced and calibrated scale beam, is then placed on the test panel. Tungsten Carbide Contour Shear tool (S-20) is used for this test. Operated by an on/off switch, the turntable rotates at a constant speed. By changing the load on the cutting tool, the resistance to shearing or scratching of the coating can be evaluated. The removable scale beam is affixed to the instrument by sliding it onto an adjustable gage block shaft. So the scale beam can remain in a level position relative to the specimen and turntable, the gage block can be raised and lowered. By changing the position of the sliding weight(s), the load applied on the specimen by the cutting tool can be selected from 0-1000 g.

EXAMPLES

The primer layers formed in the Examples have the following pre-bake composition:

TABLE 1

Liquid Primer

| Ingredient | Liquid Wt % | Solid Wt % |
|---|---|---|
| Fluoropolymer FEP | 12.5 | 40.3 |
| Polyamideimide | 1.1 | 3.5 |
| Polyethersulfone | 7.6 | 24.4 |
| NMP* | 47.8 | |
| Other Organics** | 20.1 | |
| Pigments | 9.9 | 31.8 |
| Dispersing Agent | 1.0 | |
| Total | 100.0 | 100.0 |

*NMP is N-methyl-2-pyrrolidone
**Other organics may include solvents such as butyrolactone, NMP, alcohols, methyl ethyl ketone, methyl isobutyl ketone, hydrocarbons such as heavy naphtha, and xylene, furfuryl alcohol, triethanol amine, and mixtures thereof.
FEP: TFE/HFP fluoropolymer powder containing 11-12.5 wt % HFP, a having an average particle size of 8 micrometers, a melt flow rate of 6.8-7.8 g/10 min measured at 372° C. by the method of ASTM D-1238 (5 kg weight), and a melting temperature of 260° C.

The overcoat inner and outer layers formed in the Examples have the following pre-bake compositions:

TABLE 2

Liquid Overcoat Outer Layer Composition

| Ingredient | Outer Layer Liquid | | Outer Layer Solid | |
|---|---|---|---|---|
| | 1 wt % | 2 wt % | 1 wt % | 2 wt % |
| Perfluoropolymer PFA | 45.0 | 49.3 | 100.0 | 95.2 |
| Perfluoropolymer FEP | 0.0 | 2.5 | | 4.8 |
| Other Organics | 1.9 | 1.9 | | |
| Water | 42.5 | 43.4 | | |
| Glycerin | 9.0 | 1.2 | | |
| Thickener | 0.7 | 0.7 | | |
| Dispersing Agents | 0.9 | 1.0 | | |
| Total | 100.0 | 100.0 | 100.0 | 100.0 |

FEP: TFE/HFP fluoropolymer powder containing 11-12.5 wt % HFP, and having an average particle size of 8 micrometers, a melt flow rate of 6.8-7.8 g/10 min measured at 372° C. by the method of ASTM D-1238, and a melting temperature of 260° C.
PFA: TFE/PPVE fluoropolymer powder containing 3.8-4.8 wt % PPVE and having a melt flow rate of 10-17 g/10 min measured at 372° C. by the method of ASTM D-1238 (5 kg weight), an average particle size of 35 micrometers, and a melting temperature of 305° C. The outer layer composition 2 is a composition of the present invention, and the outer layer composition 1 is a comparative example composition.

TABLE 3

Liquid Overcoat Inner Layer Composition

| Ingredient | Inner Layer Liquid | | Inner Layer Solid | |
|---|---|---|---|---|
| | 1 wt % | 2 wt % | 1 wt % | 2 wt % |
| Perfluoropolymer PFA | 46.9 | 43.3 | 89.1 | 85.2 |
| Perfluoropolymer FEP | 0.0 | 2.2 | | 4.3 |
| Glycerin | 9.5 | 1.1 | | |
| Water | 34.1 | 43.6 | | |
| Red Mica filler | 4.4 | 4.1 | 8.4 | 8.1 |
| Thickener | 0.9 | 1.1 | | |
| Dispersing Agents | 1.1 | 1.0 | | |
| Other Organics | 1.8 | 2.4 | | |
| Tin Metal | 1.3 | 1.2 | 2.5 | 2.4 |
| Total | 100.0 | 100.0 | 100.0 | 100.0 |

The inner layer composition 2 is a composition of the present invention, and the inner layer composition 1 is a comparative example composition. The FEP and PFA in both compositions are the same as described in Table 2. The glycerin used in the compositions described in Tables 2 and 3 has a boiling temperature of 291° C. The baking conditions are set forth in the Examples.

Comparative Example

FEP Primer/Inner Layer 1/Outer Layer 1

A layer of primer (liquid FEP) is applied to both sides of a carbon steel panel prepared as described above, followed by drying at 150° C. for 10 minutes. The dry film thickness (DFT) of the primer layer is 12-19 micrometers. A layer of inner layer 1 composition is applied over the dried primer to both sides of the panel. It is baked at 399° C. for 20 minutes. The total DFT is 60-75 micrometers. A layer of outer layer 1 composition is applied over the baked inner layer to both sides of the panel. It is baked at 360° C. for 20 minutes. The total DFT is 110-125 micrometers. The baking of the inner layer results in considerable smoke being emitted by the inner layer as a result of the volatilization of the glycerin. The density of the smoke is comparable to the density of steam in a steam room of a health club or the smoke from a smoky fire.

Example 1

FEP Primer/Inner Layer 2/Outer Layer 2

A layer of primer (liquid FEP) is applied to both sides of a prepared a prepared carbon steel panel, followed by drying at 150° C. for 10 minutes. The dry film thickness (DFT) of the primer layer is 12-19 micrometers. A layer of inner layer 2 composition is applied over the dried primer to both sides of the panel. It is baked at 399° C. for 20 minutes. The total DFT is 60-75 micrometers. Very little smoke is emitted by the baking of this layer, i.e. the smoke is barely visible, because of its greatly reduced glycerin content. A layer of outer layer 2 composition is applied over the baked inner layer to both sides of the panel. It is baked at 360° C. for 20 minutes. The total DFT is 110-125 micrometers.

Test 1—Autoclave Test with Slow Decompression Rate

Panels of the Comparative Example and Example 1 are exposed to the Autoclave Test. At the conclusion of and as part of the Test the pressure is released at a rate of 100 psia (0.7 MPa)/min. The panels are rated for blister formation. The panels are scribed with parallel cuts for the Parallel Scribe Adhesion Test.

Adhesion and Blister Test Results Test 1 (100 Psia (0.7 MPa)/Min Decompression Rate)

| PHASE | Comparative Example | | Example 1 | |
|---|---|---|---|---|
| | Blisters | Adhesion | Blisters | Adhesion |
| GAS | #10 (None) | A | #10 (None) | A |
| AQUEOUS | #10 (None) | A | #10 (None) | A |

As described above with respect to the blister size and frequency rating, the blister size rating of 10 means there are no blisters in the coating, and the blister frequency rating of "none" means that there are no blisters are visible. The meaning of the adhesion rating of A (no layer release) is described above. This system of ratings is used in the tables below reporting the results decompression at different rates. As is apparent from the ratings in the table above, both coated panels passed the Autoclave Test and the Parallel Scribe Adhesion Test. The blister and adhesion ratings are made after the decompression step of the Autoclave Test.

Test 2—Autoclave Test with Medium Decompression Rate

A separate set of panels of the Comparative Example and Example 1 are exposed to the Autoclave Test under the same conditions as test 1. At the conclusion of the Test, the pressure is released at a rate of 300 psia (2.1 MPa)/min. The panels are scribed with parallel cuts for the Parallel Scribe Adhesion Test.

Adhesion and Blister Test Results Test 2 (300 Psia (2.1 MPa)/Min Decompression Rate)

|  | Comparative Example | | Example 1 | |
| --- | --- | --- | --- | --- |
| PHASE | Blisters | Adhesion | Blisters | Adhesion |
| GAS | #10 (None) | A | #10 (None) | A |
| AQUEOUS | #2(F) | NR | #10 (None) | A |

The coated panel of Example 1 passed both Tests, and the coated panel of the Comparative Example failed due to blister formation in the aqueous phase. The Parallel Scribe Adhesion Test result is not rated (NR) because of the blistering of the coating.

Test 3—Autoclave Test with Fast Decompression Rate

A separate set of panels of the Comparative Example and Example 1 are exposed to the Autoclave Test under the same conditions as test 1. At the conclusion of the Test, the pressure is released at a rate of 1000 psia (6.9 MPa)/min. The panels are scribed with parallel cuts for the Parallel Scribe Adhesion Test.

Adhesion and Blister Test Results Test 3 (1000 Psia (6.9 MPa)/Min Decompression Rate)

|  | Comparative Example | | Example 1 | |
| --- | --- | --- | --- | --- |
| PHASE | Blisters | Adhesion | Blisters | Adhesion |
| GAS | #10 (None) | A | #10 (None) | A |
| AQUEOUS | #2(MD) | NR | #10 (None) | A |

The test panel of Example 1 passed both Tests, and the test panel of the Comparative Example failed due to blister formation and adhesion loss in the aqueous phase.

Test 4—Autoclave Test with Very Fast Decompression Rate

A separate set of panels of the Comparative Example and Example 1 are exposed to the Autoclave Test under the same conditions as test 1. At the conclusion of the testing procedure, the pressure is released at a rate of 3000 psia (20.7 MPa)/min. The panels are scribed with parallel cuts for the Parallel Scribe Adhesion Test.

Adhesion and Blister Test Results Test 4 (3000 Psia (20.7 MPa)/Min Decompression Rate)

|  | Comparative Example | | Example 1 | |
| --- | --- | --- | --- | --- |
| PHASE | Blisters | Adhesion | Blisters | Adhesion |
| GAS | #1(D) | NR | #10 (None) | A |
| AQUEOUS | #0(D) | NR | #10 (None) | A |

The test panel of Example 1 passed both Test, and the test panel of the Comparative Example failed due to blister formation and adhesion loss in both phases. The blisters rated as #0 are in fact lose flaps of coating exposing the underlying surface of the test panel, resulting from the rupture of blisters.

Test 5—Autoclave Test with Extremely Fast Decompression Rate

A separate set of panels of the Comparative Example and Example 1 are exposed to the Autoclave Test under the same conditions as test 1. At the conclusion of the testing procedure, the pressure is released at a rate of 10000 psia (69 MPa)/min. The panels are scribed with parallel cuts for the Parallel Scribe Adhesion Test. The results are the same as reported under Test 4 above. The test panels coated according to Example 1 exhibit a blister rating of #10 and Adhesion rating of A for both the gas and aqueous phase areas of contact of the coated panels within the autoclave. In addition to the higher decompression rate used in this test as compared to Test 4, an additional challenge is introduced in the Test 5, namely the 3.8 cm×15.2 cm panels, instead of being flat are curved having been cut from either a 3½" (8.9 cm) outer diameter pipe or a 4½ in. (11.4 cm) outer diameter pipe, each containing the test lining. The curved lining is more prone to blistering and loss of adhesion than a flat lining that is characteristic of the panels used in Tests 1-4. When flat panels are used under the Test 5 conditions as in Tests 1-4, such flat panels also pass the Autoclave and Adhesion Tests These tests show that the presence of a small amount of FEP in the overcoat of the formulation change has made a substantial change in the resistance of the coating to rapid decompression, at least up to 10,000 psia. Preferably, the compositions of the present invention provide a Blister rating of #10 at a decompression rate of at least 300 psia (2.1 MPa)/min, more preferably at least 1000 psia (6.9 MPa)/min., and even more preferably, at least 3000 psia (20.7 MPa)/min., and most preferably, at least 10000 psia (69 MPa)/min. in the Autoclave Test. Preferably, the Parallel Scribe Adhesion Test rating at each of these decompression rates is A.

Test 6—Falling Abrasive Test

The overcoat compositions of the present invention exhibit another improvement, which is improved abrasion resistance. A separate set of panels of the Comparative Example and Example 1 are tested for resistance to abrasion using ASTM D968-05 (2010) Standard Test Methods for Abrasion Resistance of Organic Coatings by Falling Abrasive. The abrasive used for the test is 24 grit aluminum oxide. The Comparative Example requires 12.37 Kg of abrasive to cut through the non-stick coating to the panel surface (substrate). Example 1 requires 18.49 Kg of abrasive to cut through the coating to the substrate, offering an improvement of about 49% more resistance to abrasion. The improvement in abrasion resistance can also be expressed in terms of kg/unit of coating thickness, the original non-stick coating thickness for both coatings being 5.6 mils (141 micrometers). Expressed in these terms, the 12.37 Kg amount of abrasive corresponds to 2.2 Kg/mil (0.088 kg/micrometer) of coating thickness, and the 18.49 kg of abrasive corresponds to 3.3 kg/mil (0.13 kg/micrometer) of coating thickness. The preferred amount of improved abrasion resistance for non-stick coatings made using compositions of the present invention and according to this Falling Abrasion Test is at least 20%. This Test 6 easily exceeds this amount.

Example 2

The overcoat layers formed in this Example have the following pre-bake compositions:

TABLE 4

Overcoat Layer Composition

| Ingredient | Liquid | | | | Solid (baked) | | | |
|---|---|---|---|---|---|---|---|---|
| | wt % 1 | wt % 2 | wt % 3 | wt % 4 | wt % 1 | wt % 2 | wt % 3 | wt % 4 |
| Perfluoropolymer PFA | 46.9 | 43.3 | 36.17 | 22.52 | 89.2 | 85.2 | 67.3 | 44.9 |
| Perfluoropolymer FEP | 0 | 2.2 | 12.06 | 22.52 | | 4.3 | 22.4 | 44.9 |
| Glycerin | 9.5 | 1.1 | 1.4 | 1.31 | | | | |
| Water | 34.1 | 43.6 | 41.21 | 44.57 | | | | |
| Red mica filler | 4.4 | 4.1 | 4.25 | 3.97 | 8.4 | 8.1 | 7.9 | 7.9 |
| Thickener | 0.9 | 1.1 | 0.82 | 1.28 | | | | |
| Dispersion agents | 1.1 | 1 | 0.45 | 0.42 | | | | |
| Other organics | 1.8 | 2.4 | 2.37 | 2.22 | | | | |
| Tin metal | 1.3 | 1.2 | 1.27 | 1.19 | 2.5 | 2.4 | 2.4 | 2.4 |
| Total | 100 | 100 | 100 | 100 | 100 | 100 | 100 | 100 |

The PFA and FEP perfluoropolymers are the same as described in table 2.

Overcoat layer 1 in Table 4 contains no FEP and is therefore a layer for comparison with layers 2-4 that do contain FEP.

Preparation of samples for Adhesion and Taber Scratch Tests: Carbon steel 4"×4"×⅛" test panels are cleaned by baking 30 min. at 800° F. (427° C.) and grit blasted with 24 grit aluminum oxide to a roughness of around 70-125 microinches Ra. The panels are coated with the primer layer composition of Table 1 (22 micrometers DFT), then coated with the compositions in Table 4 (50 micrometers DFT for the overcoat). The coated panels are baked at 399° C. for 20 min. The overcoat compositions in Table 4 form a single layer overcoat, i.e. the is no mica-free outer layer applied to layer formed from the compositions of Table 4. The panels are subjected to the PWA and Cross-Hatch Adhesion Tests, as follows:

For the PWA Test, all of the coatings showed no delamination or peel-off of the coating (primer plus overcoat layer) greater than 1 cm, thereby passing the PWA Test. However, the comparison overcoat layer 1 exhibited weak cohesion within the overcoat, i.e., part of the thickness of this layer is easily scratched away by fingernail.

For the Cross-Hatch Adhesion Test, all of the overcoats including the comparison overcoat layer 1, has no delamination between the overcoat layer and the primer. However, the red color residue on the tape after the Cross-Hatch Adhesion Test is different. The presence of red residue on the tape, when the overcoat layer on the primed test panel still exhibits a red color, indicates that the overcoat layer has failed cohesively, i.e. the tape is pulling the overcoat layer apart, leaving some thickness of this layer on the primed test panel and some thickness of this layer on the tape. The overcoat layer 1 gives a red color on tape peeled from the full 100-squares grids. Overcoat 2 shows a smaller amount of red color on the tape. For both these test panels, the red-colored overcoat layer is still visible on the primed test panel. There is no visible red color on the tape peeled from overcoat layers 3 and 24 Thus, the improvement in overcoat layer cohesive strength exhibited for the overcoat layers 2, 3, and 4 is as follows: The presence of a smaller amount of red color on the tape used on overcoat layer 2 indicates an increase in cohesive strength as compared to the overcoat layer 1 having no FEP present. The absence of red color on the tape used on the overcoat layers 3 and 4 indicates a further increase in cohesive strength of the overcoats in accordance with the result of no cohesive failure of these overcoat layers when this layer is subjected to the Cross-Hatch Adhesion Test.

The Taber Shear-Scratch Tests: The overcoat layer 1 is broken to the primer at 600-650 g loading while the overcoat layers 2-4 are broken to the primer at 750-800 g loading. "Broken to the primer" means that the cutting tool has scratched through the overcoat layer to expose the primer, which is visible by not having the red coloration of the overcoat layer. The greater resistance to scratching by overcoat layers 2-4 is another indicator of their improved cohesive strength.

Both adhesion and shear-scratch tests demonstrated that FEP addition to the overcoat improves cohesive strength within the overcoat layer. The primer/overcoat layers 2-4 of this Example 2 also exhibit improved Autoclave Test and Parallel Scribe Adhesion Tests results as compared to when the Comparative Example compositions are used. To confirm this fact, test panels coated with overcoat 4 (Table 4) are overcoated with the same overcoat 4 composition, but omitting the filler component, and baked. The resulting coated panels are subjected to the Autoclave Test and a decompression rate of 1000 psia (6.9 MPa). These coated panels exhibit a blister rating of #10 and Adhesion rating of A for both the gas phase and aqueous medium phase contact areas of the panels within the autoclave. The same results are obtained when the overcoat has both an inner layer and an outer layer and (i) the outer layer is overcoat 4 of Table 4 but without filler and (ii) the inner layer is overcoat 2 of Table 4.

The compositions of the present invention as an overcoat on a primed metal substrate preferably exhibit the following: Pass the PWA Test, and/or no delamination between overcoat and primer and reduced or no cohesive failure in the Cross-Hatch Adhesion Test and/or a Taber Shear-Scratch Test load that is 10% greater than when no FEP is present. These results are preferably individually or collectively in addition to the preferred results for the Autoclave and Parallel Scribe Adhesion Test results reported under Example 1 for the composition of Example 1.

What is claimed is:

1. Metal substrate having a non-stick coating comprising a primer layer and an overcoat layer on said primer layer, said overcoat layer comprising melt-fabricable perfluoropolymer (b) having a melting temperature of at least 290° C. and an effective amount of melt-fabricable perfluoropolymer (c) having a melting temperature of no greater than 270° C. to improve the rapid decompression adhesion between said primer layer and said overcoat layer, wherein melt-fabricable perfluoropolymer (b) is a copolymer of tetrafluoroethylene and perfluoro(alkyl vinyl ether) and wherein melt-fabricable perfluoropolymer (c) is a copolymer of tetrafluoroethylene and hexafluoropropylene and wherein the amount of said perfluoropolymer of (c) present is 2 to 10 wt % based on the sum of the weights of said perfluoropolymers (b) and (c).

2. The metal substrate of claim 1 wherein said layer of baked composition further comprises about 4 to 20 wt % of filler (e) particles, based on the sum of (b), (c) and (e), for increasing the impermeability of said overcoat layer.

3. The metal substrate of claim 2 wherein said filler (e) particles are platelet in shape.

4. The metal substrate of claim 1 as down-hole oil pipe or heat exchanger tube, said non-stick coating forming the interior surface thereof.

5. The metal substrate of claim 1, said overcoat layer further comprising filler particles for increasing the impermeability of said lining.

* * * * *